United States Patent
Wilson

(10) Patent No.: US 6,616,119 B2
(45) Date of Patent: Sep. 9, 2003

(54) BYPASS ORIFICE AND FILTER FOR DIAPHRAGM TYPE FLUSH VALVE

(75) Inventor: John R. Wilson, Naperville, IL (US)

(73) Assignee: Sloan Valve Company, Franklin Park, IL (US)

(*) Notice: Subject to any disclaimer, the term of this patent is extended or adjusted under 35 U.S.C. 154(b) by 0 days.

(21) Appl. No.: 09/944,759

(22) Filed: Sep. 4, 2001

(65) Prior Publication Data

US 2003/0042446 A1 Mar. 6, 2003

(51) Int. Cl.$^7$ ................................. F16K 31/12
(52) U.S. Cl. ........................... 251/40; 251/45
(58) Field of Search .................. 251/40, 25, 41, 251/38, 45

(56) References Cited

U.S. PATENT DOCUMENTS

| | | | | |
|---|---|---|---|---|
| 3,872,878 A | * | 3/1975 | Kozel et al. ............... 251/45 |
| 4,248,270 A | * | 2/1981 | Ostrowski .................. 251/120 |
| 4,327,891 A | * | 5/1982 | Allen et al. ................ 251/40 |
| 5,082,240 A | * | 1/1992 | Richmond ................. 251/30.03 |
| 5,213,305 A | * | 5/1993 | Whiteside et al. .......... 251/40 |
| 5,363,873 A | * | 11/1994 | Richmond .................. 251/38 |
| 5,456,279 A | * | 10/1995 | Parsons et al. ............. 251/40 |
| 5,887,848 A | * | 3/1999 | Wilson ...................... 251/40 |
| 6,216,730 B1 | * | 4/2001 | Hall ........................... 251/40 |
| 6,299,128 B1 | * | 10/2001 | Verdecchia .................. 251/40 |

* cited by examiner

Primary Examiner—Gene Mancene
Assistant Examiner—John Bastianelli
(74) Attorney, Agent, or Firm—Cook, Alex, McFarron, Manzo, Cummings & Mehler, Ltd.

(57) ABSTRACT

A diaphragm type of flush valve includes a body with an inlet and an outlet. There is a filter chamber in the diaphragm upstream of the bypass orifice, which chamber extends downwardly below the diaphragm. Water within the filter chamber is quiescent and substantially less turbulent than water beneath the diaphragm. There are filter openings into the filter chamber which have a cross sectional area greater than that of the bypass orifice, but shaped to prevent the passage of particles of a size which will not pass through the bypass orifice. The diaphragm has a downwardly extending rim with spaced flow control windows therein. The rim has an inner wall and a plurality of inwardly extending ribs on the wall for dampening closing movement of the diaphragm on the valve seat.

25 Claims, 3 Drawing Sheets

BYPASS ORIFICE AND FILTER FOR DIAPHRAGM TYPE FLUSH VALVE

THE FIELD OF THE INVENTION

The present invention relates to diaphragm type flush valves for use with toilet devices such as urinals and water closets, and more specifically to improvements in the diaphragm bypass orifice and the filter which functions upstream of that orifice. Further, the invention relates to an improvement in the diaphragm which functions during the last portion of closure on its seat to provide a dampening effect and prevent the diaphragm from vibrating or creating audible noise at closing.

In a diaphragm type flush valve for the described environment there is a bypass orifice which feeds water into the pressure chamber which normally retains the diaphragm on its valve closing seat. The water beneath the diaphragm, which is directly connected to the flush valve inlet, is often turbulent and such turbulence can effect affect the flow through the bypass opening. The present invention provides a bypass which has a protected entrance, creating a zone or chamber of quiescent water directly adjacent the bypass orifice which results in a consistent flow of water through the bypass, which in turn provides a more consistent flush cycle for the valve. The bypass is formed within the flexible synthetic diaphragm by a plastic element which in its free state has a pair of uniformly sized openings. However, when the plastic filter is placed within the flexible diaphragm, the diaphragm shroud which encloses the filter provides a degree of inwardly directed bias, partially closing the legs defining the filter openings to restrict the openings so that particles which cannot pass the bypass orifice will not flow into the quiescent chamber directly adjacent the orifice.

The invention further relates to an aspect of the diaphragm which lessens the noise when the diaphragm is closing and to provide a more consistent water pressure gradient around the circumference of the primary seat upon which the diaphragm closes. This assures that the diaphragm does not encounter sudden localized pressure drops that typically result in closure noise.

The diaphragm has a downwardly extending rim which has a plurality of windows which, as the diaphragm closes upon its barrel seat, provide a dampening effect just prior to closing. This avoids vibration or other audible noise creating movement. These windows also allow a conventional flow profile during the closing portion of the diaphragm movement. Further, there are a plurality of inwardly directed ribs on the diaphragm rim which initially engage the barrel of the flush valve during closing to assist in the dampening affect effect. Although eventually the entire lip or rim of the diaphragm is closed upon the outer diameter of the flush valve barrel, the ribs provide localized high stress points during engagement which provide a micro adjustment of the amount of dampening provided by the diaphragm during the closing portion of the flushing cycle. The combination of the ribs and the windows allow the dampening capabilities of the diaphragm, and hence the flush valve, to be profiled to the requirements of a particular application.

SUMMARY OF THE INVENTION

The present invention relates to diaphragm type flush valves for use with urinals and water closets, and more specifically to improvements in the diaphragm relating to the diaphragm bypass orifice and dampening closing movement of the diaphragm.

A primary purpose is a flush valve diaphragm for the use described which utilizes a flexible diaphragm and a non-metallic or plastic filter element and bypass orifice with an entrance protected from turbulent water, resulting in a more consistent flush cycle.

Another purpose of the invention is to provide a diaphragm for the use described which includes elements effecting affecting the final closing movement of the diaphragm upon its seat which dampen such movement and prevent undesirable noise.

Another purpose is a diaphragm of the type described in which the bypass and filter are formed with a filter chamber which extends below the diaphragm and which provides a protected zone from the turbulent water normally beneath the diaphragm.

Another purpose is a diaphragm as described which has a downwardly extending rim which includes both windows and ribs which affect the flow of water during the closing portion of the flush valve cycle and which dampen closing movement of the diaphragm upon its valve seat.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
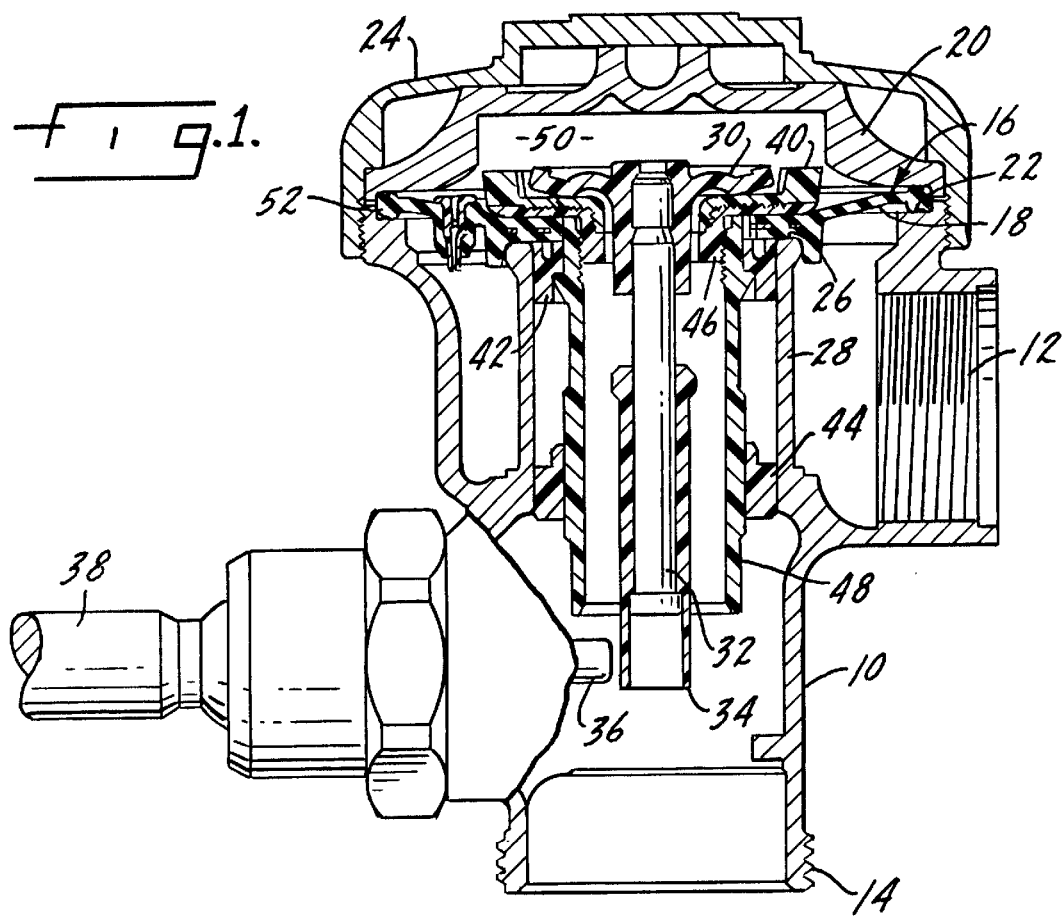
FIG. 1 is a side view, in part section, illustrating a flush valve of the present invention.

The present invention relates to improvements in a diaphragm for a flush valve for use with urinals and water closets, and more specifically to an improved bypass and filter and to improvements on the diaphragm which add control to the closing portion of the diaphragm movement cycle. The diaphragm is upgraded by the use of a synthetic material and a plastic bypass and filter element. This particular construction is more tolerant of solid particles, which are common in most water supply systems. The use of a plastic filter replaces the existing metal bypass and filter which upgrades the diaphragm assembly. Further, the diaphragm bypass and filter are so constructed as to provide a protected entrance for the bypass orifice or a zone of essentially quiescent water directly adjacent the bypass orifice.

Typically, the area beneath the flush valve diaphragm has very turbulent water. By providing a protected entrance, the turbulent water beneath the diaphragm does not affect flow through the bypass which results in a more consistent flushing cycle. In addition to the improvements specifically directed to the bypass and filter, the upstream side of the diaphragm has a downwardly extending rim, which has both windows and dampening ribs, to prevent the diaphragm from vibrating or creating audible noise during closure. The windows allow water flow during the final closing phase of the diaphragm cycle so that the conventional flow profile of the flush valve is not altered. The ribs provide localized higher stress points during engagement of the diaphragm rim with the flush valve barrel which provides a micro adjustment of diaphragm movement during closure. Initially, the ribs engage the barrel and provide a small dampening effect with eventually the entire surface of the diaphragm rib being intimate with the outer diameter of the barrel. The combination of the diaphragm ribs and windows allows the dampening capabilities of the diaphragm to be profiled to a specific flush valve requirement. Further, these improvements on the diaphragm allow a consistent water pressure gradient around the circumference of the primary seat which assures the diaphragm does not encounter sudden localized pressure drops that typically result in noise generation during closure of the flush valve diaphragm on its seat.

The flush valve includes a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screw threaded onto the body to hold the inner cover in position.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly 16 includes a relief valve 30 having a downwardly extending stem 32 carrying a movable sleeve 34. Sleeve 34 is positioned for contact by a plunger 36 when operated by a handle 38 as its is conventional in the operation of flush valves of the type described.

The diaphragm assembly 16, in addition to diaphragm 18 and the relief valve 30, includes a retaining disk 40, a refill ring 42 and a flow control ring 44. The underside of the retaining disk 40 is threadedly attached to a collar 46, which in turn is threadedly attached at its exterior to a sleeve 48 which carries the refill ring 42. The above described assembly of elements firmly holds the diaphragm 18 between the upper face of the refill ring 42 and a lower facing surface of the collar 46.

Above the diaphragm assembly 16 is a pressure chamber 50 which maintains the diaphragm assembly in a closed position when the flush valve is not in use.

As is known in the art, when the handle 38 is operated, the plunger 36 will contact sleeve 34, lifting the relief valve 30 off its seat on the retaining disk 40. This will permit the discharge of water within the pressure chamber 50 down through the sleeve 48. Inlet pressure will then cause the diaphragm to move upwardly off its seat 26, permitting direct communication between the inlet 12 and the outlet 14 through the space between the bottom of the diaphragm assembly and the seat 26. As soon as this operation has taken place, the pressure chamber 50 will begin to fill through the to-be-described filter and bypass orifice in the diaphragm assembly. As flow continues into the pressure chamber 50, the diaphragm assembly will move toward its valve seat and when it has reached that position, the flush valve will be closed. It is important that the time period for which the flush valve is open be tightly controlled so that the volume of water which passes through the valve in a single flushing operation can be held to the close tolerance required by the various state and federal regulations in place at the present time.

Figure 2:
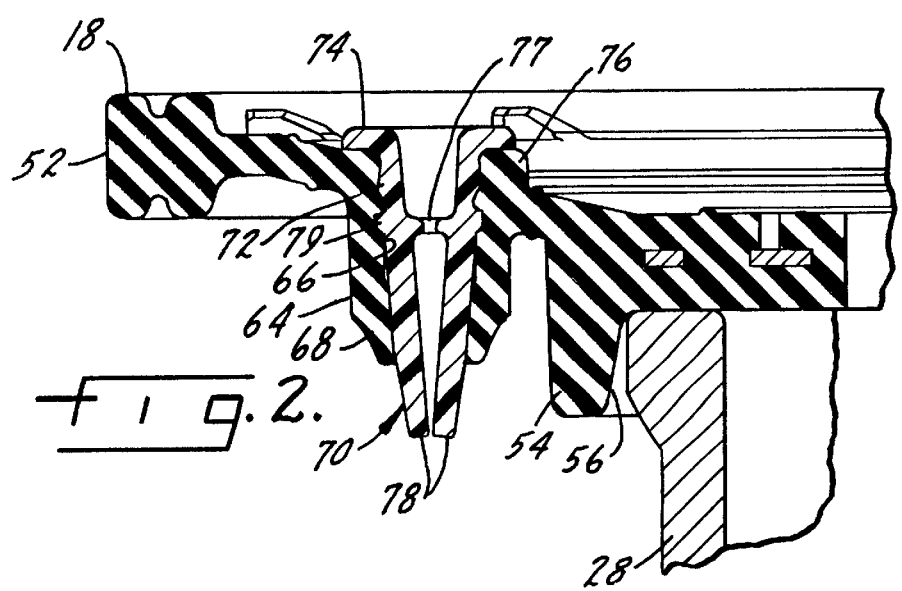
FIG. 2 is an enlarged partial section illustrating the diaphragm bypass orifice and filter.
Figure 3:
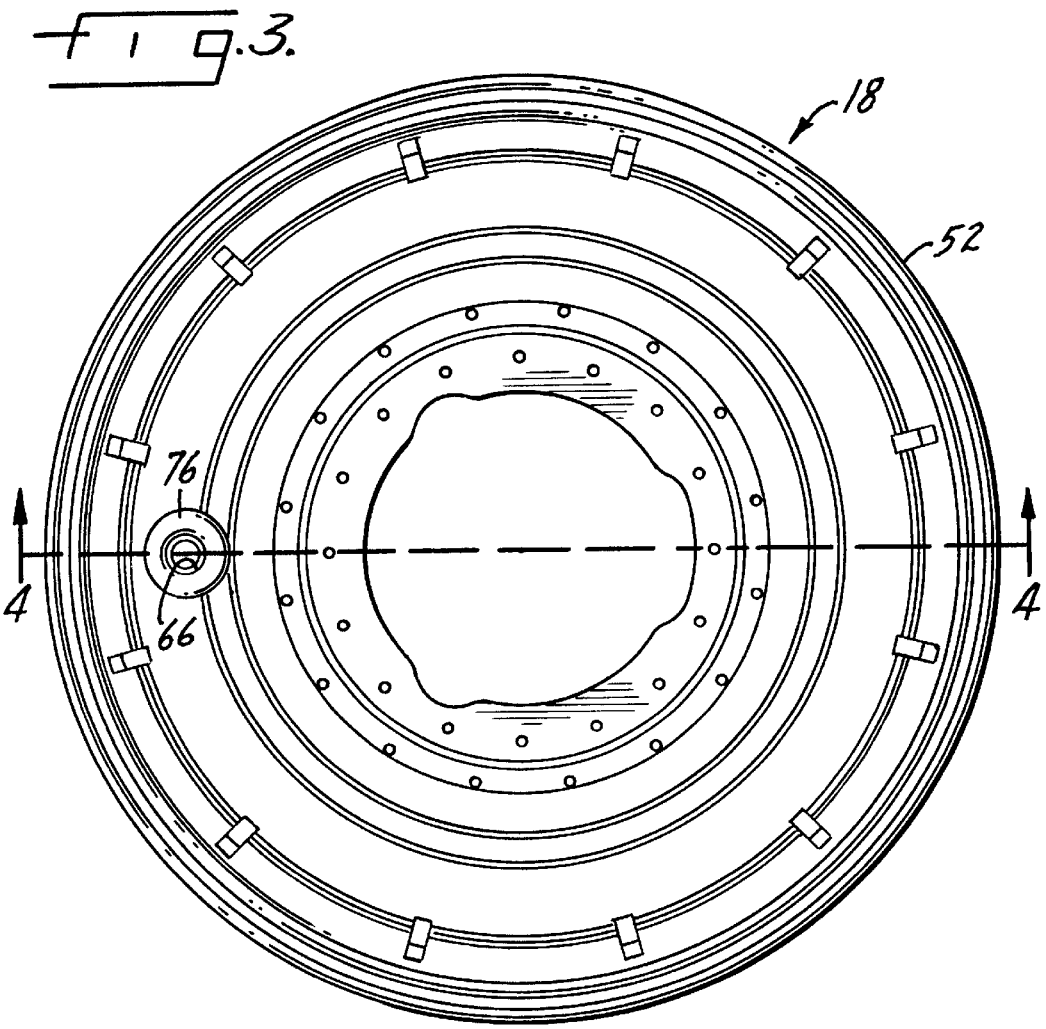
FIG. 3 is a top plan view of the diaphragm.
Figure 4:
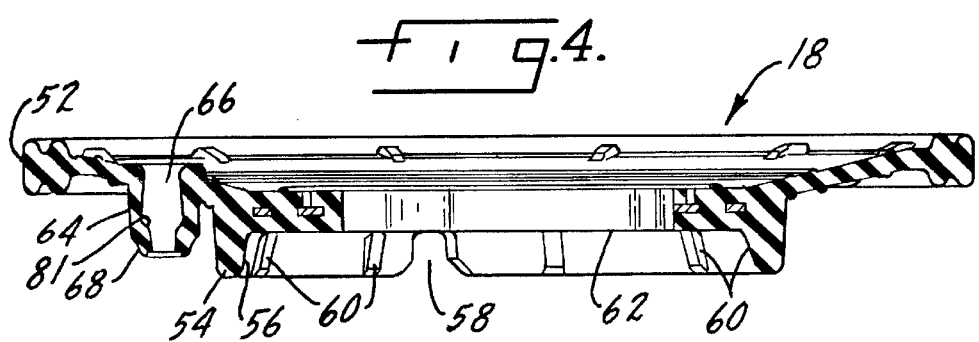
FIG. 4 is a section of the diaphragm along plane 4—4 of FIG. 3.
Figure 5:
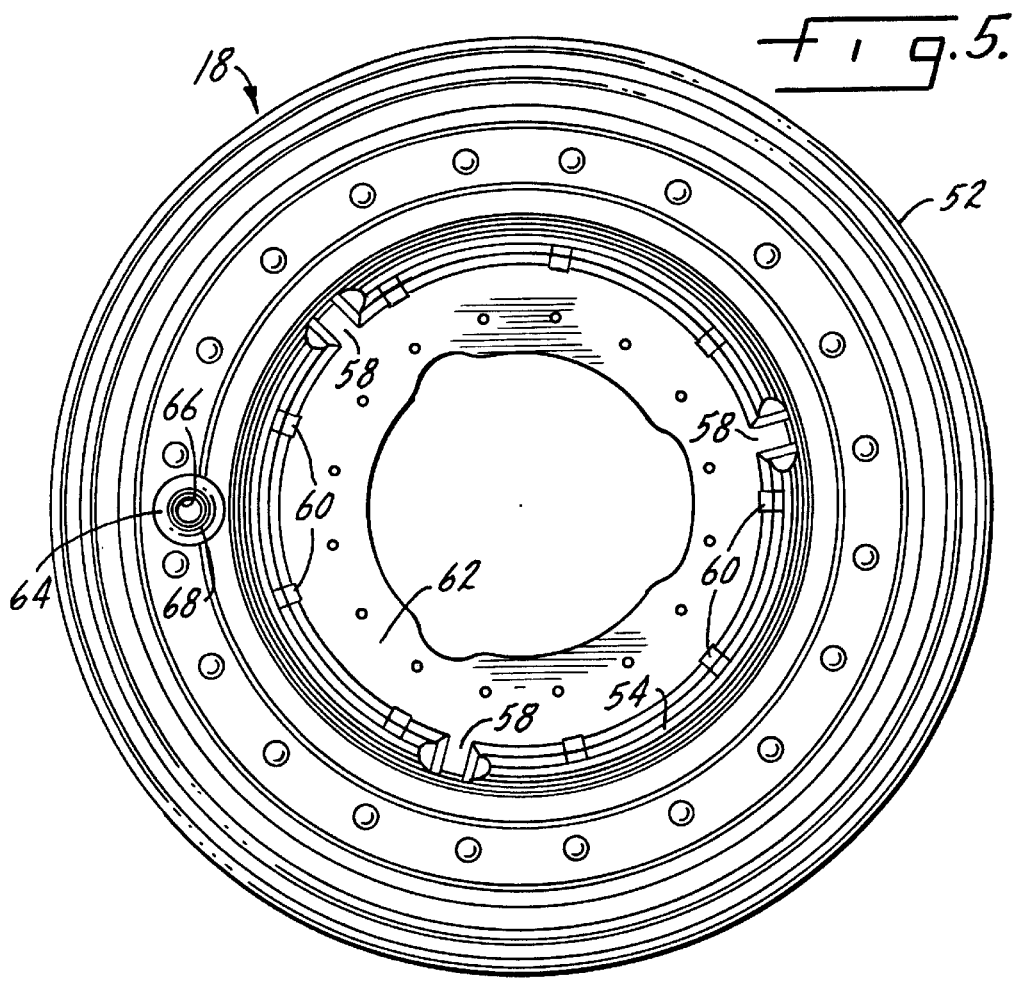
FIG. 5 is a bottom view of the diaphragm.
Figure 7:
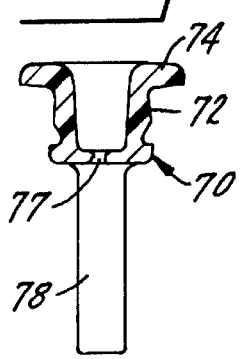
FIG. 7 is a section along plane 7—7 of FIG. 6.
Figures 6, 8, 9:
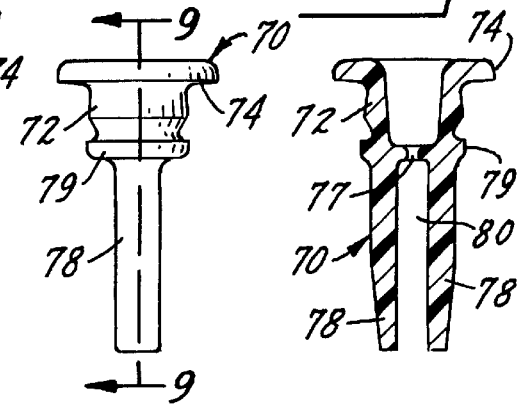
FIG. 6 is a side view of the filter.
FIG. 8 is a side view of the filter, rotated 90° from FIG. 7.
FIG. 9 is a section along plane 9—9 of FIG. 8.

The diaphragm 18 has a peripheral edge 52 which will be held between the shoulder 22 of the body 10 and the inner cover 20. Spaced from the edge 52 is a downwardly extending rim 54, shown particularly in the section of FIG. 2. When in the closed position, the inner wall 56 of the rim 54 will extend about the upper end of the barrel 28. Focusing specifically on the interior wall 56, there are a plurality, in this case three, windows 58 in the rim 54 which will modulate the flow of water as the diaphragm closes upon the valve seat at the upper end of the barrel. There are further a plurality, in this case nine, inwardly directed ribs 60 which will have a slight interference fit with the outer diameter of the barrel 28 at closing. This provides a dampening or slowing of the diaphragm in the closing portion of its cycle and prevents it from vibrating or creating audible noise at closing. When the diaphragm is fully closed, the flat surface 62 directly inside the rim 54 will be seated firmly on top of the barrel 28.

The bypass orifice and filter are shown particularly in FIGS. 6–9. Integral with the diaphragm 18 is a downwardly extending flexible shroud 64 which has a chamber 66 within it and which has an in-turned lip 68 at its upstream or downward end. The entire diaphragm, including the shroud, is formed of a suitable elastomeric material, preferably a synthetic material such as PERM-X or EPDM.

Positioned within the shroud 64 is a filter element 70 which has an upper body portion 72 with an out-turned shoulder 74, which seats upon a boss 76 on the upper side of the diaphragm. Thus, the filter 70 extends through the shroud and has an upper portion which seats on top of the diaphragm. The filter element 70 has a bypass orifice 77 through which water flows to reach the pressure chamber 50 on top of the diaphragm 18.

The filter 70 has a pair of downwardly extending legs 78, each of which in their free state provide an opening 80 of consistent cross section. There is a flange 79 on the filter which rests on a shoulder 81 in chamber 66 to partially support the filter in the shroud. When the filter 70 is inserted within the shroud 64, the in-turned lips 68 of the shroud will bias the legs of the filter element inwardly, or toward each other creating a triangular shaped bypass opening for water to flow from beneath the diaphragm, into the chamber 66 within the shroud, then through the bypass orifice 77, and into the pressure chamber above the diaphragm. The cross sectional area of the combined entrances into the zone beneath the bypass orifice is greater than the area of the orifice so there is no restriction of water flow. An 8 to 1 ratio is preferred. However, the largest dimension of the triangular shaped openings into the zone or chamber beneath the bypass orifice is such that no particle can pass through these openings which would not pass through the bypass orifice. Thus, the filter provides complete protection for the bypass orifice.

Of importance is the fact that the shroud 64 and the filter element provide a chamber or zone in which the water is essentially quiescent, as contrasted with the turbulent water beneath the diaphragm. This results in a more consistent flush cycle because there is no turbulent water directly beneath the bypass opening, rather, there is calm water which provides consistent flow.

Also of importance in the invention are the improvements which allow consistent closing of the diaphragm, with a dampening effect to prevent vibration and undesirable noise. The consistent closure results in a consistent flush cycle. To the same end, the bypass opening is protected from the turbulent water beneath the diaphragm, resulting in a smooth flow of water through the bypass opening which again results in a consistent flush cycle.

Whereas the preferred form of the invention has been shown and described herein, it should be realized that there may be many modifications, substitutions and alterations thereto.

The embodiments of the invention in which an exclusive property or privilege is claimed are defined as follows:

1. A diaphragm-type flush valve including a body having an inlet and an outlet, a valve seat between said inlet and outlet and a valve member movable to a closing position on said valve seat to control water flow between said inlet and outlet, said valve member including a flexible diaphragm peripherally attached to said body, a pressure chamber above said diaphragm with water therein holding said valve member on said valve seat, a bypass opening in said flexible diaphragm connecting said inlet with said pressure chamber to provide water therefor to move said diaphragm to said closing position, a shroud attached to said diaphragm upstream of said bypass opening and extending downwardly below said diaphragm, the shroud defining a filter chamber in fluid communication with the bypass opening, legs which extend beyond the shroud to define filter openings, said filter openings having a combined cross sectional area greater than that of said bypass opening, and the filter openings being shaped to prevent the passage of particles of a size which will not pass through the bypass opening.

2. The flush valve of claim 1 including a filter element positioned within said diaphragm and having portions thereof defining said filter chamber.

3. The flush valve of claim 2 wherein said shroud substantially encloses said filter element.

4. The flush valve of claim 3 wherein said shroud has an inwardly directed lip at the upstream end thereof, which lip holds said filter element within said extension.

5. The flush valve of claim 3 wherein said legs are formed on the filter element, spaces between said legs forming said filter openings.

6. The flush valve of claim 5 wherein said spaces are generally constant in width when said filter element is in free state outside of said shroud.

7. The flush valve of claim 6 wherein said shroud has an inwardly directed lip at the upstream end thereof, which lip biases said filter element legs toward each other at the upstream end thereof, forming filter spaces which are non-uniform in width.

8. The flush valve of claim 1 wherein said diaphragm has a downwardly extending rim facing said valve seat and a plurality of spaced flow control windows in said rim.

9. The flush valve of claim 8 wherein said windows are generally equally spaced one from another.

10. The flush valve of claim 8 wherein said rim has an inner wall, and a plurality of inwardly extending ribs on said inner wall for dampening closing movement of said diaphragm on said valve seat.

11. The flush valve of claim 10 wherein said valve seat includes an upwardly extending annular wall, with said diaphragm rim being coaxial with and outside of said wall when said diaphragm is closed on said valve seat.

12. A valve member assembly for use in a toilet device flush valve having a valve body and an inlet and an outlet, said flush valve having a seat to close communication between said inlet and outlet, and said valve member assembly being formed and adapted to close upon said seat, said valve member assembly including a flexible diaphragm, a bypass opening in said flexible diaphragm, a shroud attached to said diaphragm upstream of said bypass opening and extending downwardly below said diaphragm, the shroud defining a filter chamber in fluid communication with the bypass opening, legs which extend beyond the shroud to define filter openings said filter openings having a combined cross sectional area greater than that of said bypass opening and the filter openings being shaped to prevent the passage of particles of a size which will not pass through said bypass opening.

13. The flush valve of claim 12 including a filter element positioned within said diaphragm and having portions thereof defining said filter chamber.

14. The flush valve of claim 13 wherein shroud substantially encloses said filter element.

15. The flush valve of claim 14 wherein said shroud has an inwardly directed lip at the upstream end thereof, which lip holds said filter element within said extension.

16. The flush valve of claim 14 wherein said legs are formed on the filter element spaces between said legs forming said filter openings.

17. The flush valve of claim 16 wherein said spaces are generally constant in width when said filter element is in a free state outside of said shoud.

18. The flush valve of claim 17 wherein said shroud has an inwardly directed lip at the upstream end thereof, which lip biases said filter element legs toward each other at the upstream end thereof, forming filter spaces which are non-uniform in width.

19. The flush valve of claim 12 wherein said diaphragm has a downwardly extending rim facing said valve seat, and a plurality of spaced flow control windows in said rim.

20. The flush valve of claim 19 wherein said windows are generally equally spaced one from another.

21. The flush valve of claim 19 wherein said rim has an inner wall, and a plurality of inwardly extending ribs on said inner wall for dampening closing movement of said diaphragm on said valve seat.

22. The flush valve of claim 21 wherein said valve seat includes an upwardly extending annular wall, with said diaphragm rim being coaxial with and outside of said wall when said diaphragm is closed on said valve seat.

23. A diaphragm-type of flush valve including a body having an inlet and an outlet, a valve seat between said inlet and outlet, and a valve member movable to a closing position on said valve seat to control water flow between said inlet and outlet, said valve member including a diaphragm peripherally attached to said body, a pressure chamber above said diaphragm with water therein holding said valve member on said valve seat, a filter and bypass orifice connecting said inlet with said pressure chamber to provide water thereto to move said diaphragm to said closing position, the diaphragm defining an axis, annular rim extending axially downwardly and facing said valve seat, the rim including a plurality of spaced flow control windows in said rim which permit generally radially-directed flow therethrough.

24. The flush valve of claim 23 wherein said rim has an inner wall and a plurality of inwardly extending ribs on said wall for dampening closing movement of said diaphragm on said valve seat.

25. A valve member assembly for use in a toilet device flush valve having a valve body and an inlet and an outlet therefor, said flush valve having a seat to close communication between said inlet and outlet, and said valve member assembly being formed and adapted to close upon said seat, said valve member assembly including a diaphragm defines an axis, a filter and bypass orifice formed in said valve member assembly for use in connecting the flush valve inlet, and a flush valve pressure chamber above the valve member assembly to cause movement thereof to a valve closing position, said diaphragm having an annular rim extending axially downwardly and facing said valve seat, a plurality of spaced flow control windows in said rim which permit generally radially-directed flow therethrough, said rim having an inner wall, and a plurality of inwardly extending ribs on said wall for dampening closing movement of said diaphragm on said valve seat.

* * * * *